Dec. 7, 1948. J. G. DELY 2,455,473
PROCESS FOR REGENERATING SPENT
AMMONIACAL CUPROUS SOLUTION
Filed Feb. 7, 1945
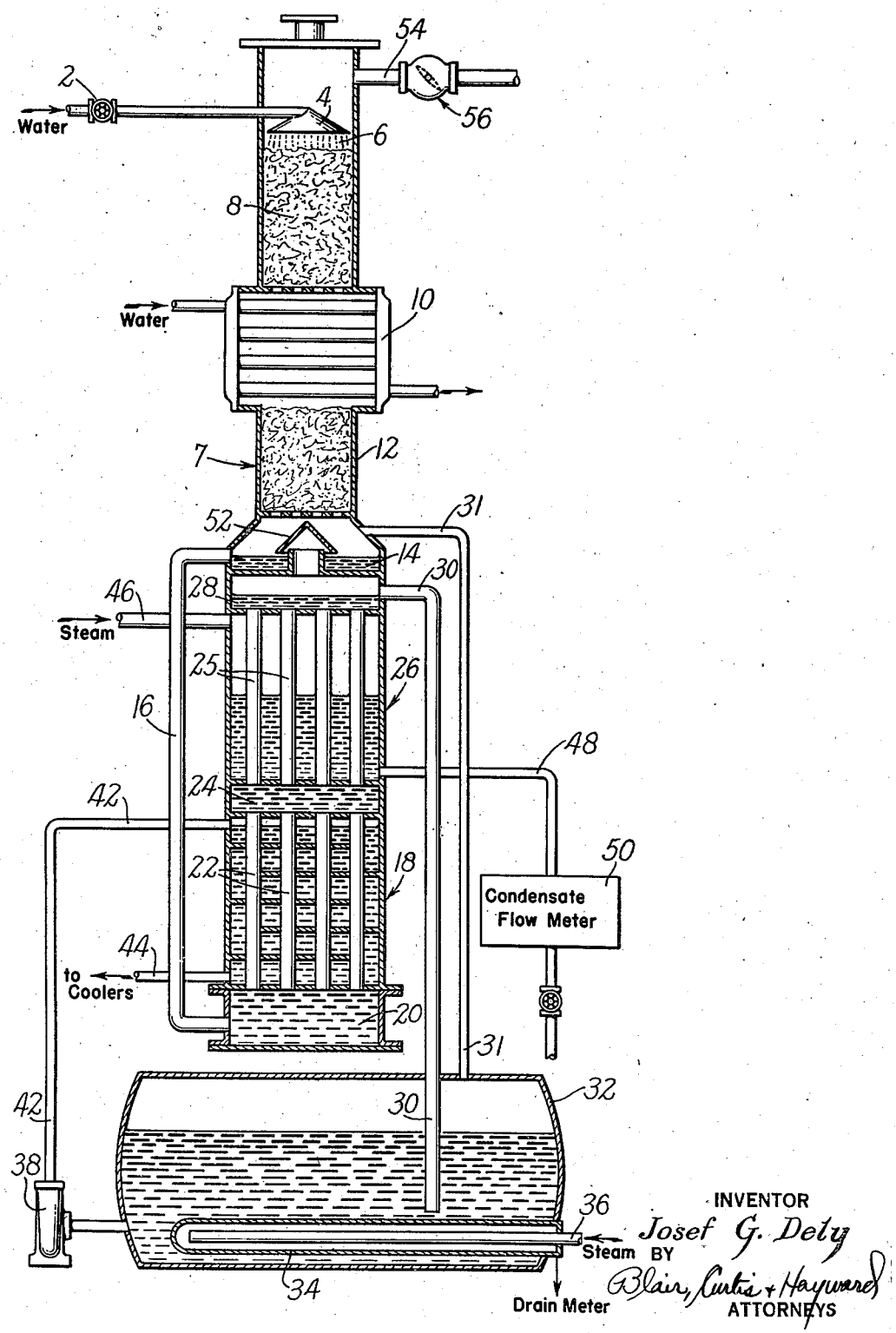
INVENTOR
Josef G. Dely
BY
Blair, Curtis + Hayward
ATTORNEYS Patented Dec. 7, 1948

2,455,473

UNITED STATES PATENT OFFICE 2,455,473

PROCESS FOR REGENERATING SPENT AMMONIACAL CUPROUS SOLUTION

Josef G. Dely, Queens Village, N. Y.

Application February 7, 1945, Serial No. 576,535

4 Claims. (Cl. 252—188)

This invention relates to gas purification and more particularly to the regeneration of ammoniacal copper formate solutions used to absorb carbon oxides and oxygen in the synthesis of ammonia.

An object of this invention is to provide a method and apparatus for the regeneration of solutions such as are used for the absorption of gases. A further object is to provide for the continuous regeneration of ammoniacal copper formate solutions used in the purification of nitrogen-hydrogen mixtures in the synthesis of ammonia. A further object is to provide a method and apparatus as referred to above wherein ammoniacal copper formate solutions are regenerated continuously without excessive loss of ammonia, which loss is commonly incident to such processes presently in use. These and other objects will be in part obvious and in part pointed out below.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the drawing the single figure is a schematic representation of the system embodying the invention.

An illustrative use for my invention is in the regeneration of copper formate solutions used for the purification of make-up gas mixtures delivered to the synthesis circuit in the direct synthesis of ammonia. In such a system a copper formate solution at relatively low temperature is brought into contact with the make-up gas for the purpose of removing such carbon dioxide, carbon monoxide, and oxygen as are present. The system shown in the drawing is for the purpose of regenerating this solution for re-use after these gases have been absorbed. That is, the copper formate solution is restored to its original state by eliminating the gases taken up during the purification of the make-up gas. The absorption of carbon monoxide and carbon dioxide is effected by a combination resulting in the formation of loosely bound complex cuprous salts, and the regeneration involves decomposition followed by a combined reducing and oxidizing action. The details of this reaction are known and need not be discussed here, although during the reaction metallic copper is formed which reacts directly with cupric salts to restore the solution to its original form. However, these reactions may be indicated in simplified form as follows:

1. Absorption of carbon monoxide
   $$Cu_2O + 2CO = Cu_2O:2CO$$
2. Decomposition by heat
   $$Cu_2O:2CO + heat = Cu_2O + 2CO$$
3. Reduction
   $$Cu_2O:2CO = 2Cu + CO + CO_2$$
4. Further reduction
   $$2CuO + 2Cu = 2Cu_2O$$

These reactions eliminate the gases absorbed and return the solution to its original state for further use. During the above-noted reaction of decomposition by heat there is oxidation which is not indicated in the above simplified equation but which is expressed as follows:

$$2HCOOH + \tfrac{1}{2}O_2 \rightarrow (COOH)_2 + H_2O$$

In all presently known processes for this regeneration, the application of heat results in an excessive reduction of the solution; that is, too much oxygen is used. It is therefore necessary to add additional air which must be removed and during the removal it carries with it appreciable quantities of ammonia; this is wasteful and costly.

In accordance with the present invention, the regeneration is carried on by carefully controlling the pressure and the temperature. In this way the desired quantity of carbon monoxide is retained in the solution so that the proper oxidizing and reducing actions take place without the use of excess air. Thus, the gases are removed economically at a relatively low temperature and with a minimum loss of ammonia. The regeneration takes place in such a manner that the outgoing gases flow in counter-current contact with the incoming cool solution so that ammonia driven from the solution is reabsorbed.

Referring to the drawing, the solution to be regenerated enters the system at the upper left-hand corner through a pressure reduction valve 2, where its pressure is reduced. The solution flows to a spray head 4 or other distributor into a scrubber section 6 which forms the top of a tower generally indicated at 7. Section 6 is ring-packed at 8 so that the solution flows down in intimate contact with gas flowing up through the section. At the bottom of section 6 is a tube nest 10 which is a water tube, heat-exchange unit having cooling water in its tubes and with the solution being cooled as it passes down around the tubes.

Beneath tube nest 10 is a second scrubber section 12 which is also ring-packed so that the solution cooled in the tube nest, again flows in countercurrent contact with the up-flowing gas. From the bottom of section 12 the solution flows into a sump 14 and thence to the left through a pipe 16 to the bottom of a heat-exchange section 18 having a channel 20 at the bottom into which the solution first passes. The solution flows upwardly through tubes 22 to a channel 24 and thence through tubes 25 of an upper heat-exchange section 26 to an upper channel 28. From channel 28 the solution passes downwardly through a pipe 30 to a final heating and storage tank 32 which is heated by a steam heating unit 34 to which steam is supplied by pipe 36. The solution is pumped from tank 32 to the left by pump 38 and thence through a pipe 42 to heat-exchange section 18 where it is directed by baffles past pipes 22 to a discharge pipe 44. From pipe 44 the solution passes to suitable coolers and thence is returned to the purification system for reabsorption of gases.

Heat-exchange section 26 is supplied with steam at the top through a pipe 46 and condensate is withdrawn at the bottom through a pipe 48, the outlet of which is controlled by a condensate flow-meter 50. Meter 50 may be remotely positioned with respect to the remainder of the apparatus shown, and by regulating the rate of removal of the condensate, the heating within the heat-exchange section is accurately controlled. That is, if the condensate outlet is restricted so that the condensate level rises in the heat-exchange section, the heating of the solution within pipes 50 by the steam is reduced. By supplying steam at a known temperature, the heating within the heat-exchange section may be accurately controlled by merely metering the outflow of condensate, and the level of condensate in the heat-exchange section automatically assumes the desired level.

In sections 18 and 26 the temperature of the solution is raised gradually so that there is a reducing action, and carbon monoxide is discharged from the top of channel 28 through a hooded outlet 52. These gases pass upwardly through scrubber section 12, tube nest 10, and scrubber section 8 and thence to the right through a discharge pipe 54, which has a pressure control valve 56. Valve 56 is so adjusted as to maintain a desired pressure within tower 7.

With this system the major portion of the carbon monoxide and some smaller portions of the other gases are removed from the solution by the gradual heating in sections 18 and 26, and the gases so removed pass through the hooded outlet 52 to the bottom of section 12. Additional gases composed largely of water vapor, ammonia vapor, and carbon dioxide, but also including traces of carbon monoxide, hydrogen and nitrogen, are discharged from the solution in tank 32 and pass upwardly through a pipe 31 to join the gases from outlet 52. These gases all pass upwardly through section 12, nest 10, and section 8 where they flow in countercurrent contact with the incoming cold solution. The ammonia present in this gas stream, and relatively small amounts of the other gases, are absorbed by the solution after which the stream of gas, substantially free of ammonia, passes through pipe 54 and control valve 56.

Valve 56 is so controlled that a back pressure is maintained on the system which is sufficient to hold the gases in the solution to permit the oxidation and reduction reactions to take place. During operation, if the regenerated liquor has been overoxidized, valve 56 is throttled so as to increase the pressure in the system thereby to increase the rate of reduction in the solution. On the other hand, if less reducing action is required for proper regeneration, then the valve is opened wider and the pressure on the system reduced. Where the oxygen content of the gas being purified is so low as to result in a negligible oxygen content of the copper solution returning to the regenerating system, the admission of small quantities of air into channel 20 or tank 32 may be resorted to.

As many possible embodiments may be made of the above invention and as many changes might be made in the embodiment above set forth, it is to be interpreted as illustrative and not in a set forth, or shown in the accompanying drawing, is to be interpreted as illustrative and not in a limiting sense.

I claim:

1. A process for regenerating a spent ammoniacal cuprous solution that has been used for absorbing carbon oxides from the feed gases to an ammonia synthesis unit comprising the steps of, causing a substantially continuous stream of said spent solution to flow downwardly along a gas-liquid contact path from the top to the bottom thereof, causing the solution leaving said contact path to flow successively through a first regenerating zone and a second regenerating zone, heating said solution in both said first and second regenerating zones to liberate a mixture of carbon oxides and ammonia therefrom, causing the thus liberated mixtures of carbon oxides and ammonia from both said first and second regenerating zones to flow to the bottom of said contact path and upwardly along said path to cause ammonia from said mixture to be preferentially absorbed by said stream of solution in said contact path, cooling said spent solution in said path to increase the solubility of ammonia therein, removing at the top of said contact path gases not absorbed by said solution in said path, causing regenerated solution from said second regenerating zone to flow in heat-exchange relationship with the spent solution in said first regenerating zone to supply to said spent solution heat required to liberate said mixture of carbon oxides and ammonia therefrom, and maintaining a back pressure on said contact path and said regenerating zone to produce a desired cupric-cuprous ratio in the regenerated solution while minimizing reduction of cuprous copper to elemental copper.

2. A process for regenerating a spent ammoniacal cuprous solution that has been used for absorbing carbon oxides from the feed gases to an ammonia synthesis unit comprising the steps of, causing a substantially continuous stream of said spent solution to flow downwardly along a gas-liquid contact path from the top to the bottom thereof, causing the solution leaving said contact path to flow successively through a first regenerating zone and a second regenerating zone, heating said solution in both said first and second regenerating zones to liberate a mixture of carbon oxides and ammonia therefrom, causing the thus liberated mixtures of carbon oxides and ammonia from both said first and second regenerating zones to flow to the bottom of said contact path and upwardly along said path to cause ammonia from said mixture to be preferentially absorbed by said stream of solution in said contact path, removing at the top of said contact path gases not absorbed by said solution in said path, causing regenerated solution from said second regenerating zone to flow in heat-exchange relationship with the spent solution in said first regenerating zone to supply to said spent solution heat required to liberate said mixture of carbon oxides and ammonia therefrom, and maintaining a back pressure on said contact path and said regenerating zone to produce a desired cupric-cuprous ratio in the regenerated solution while minimizing reduction of cuprous copper to elemental copper.

3. A process for regenerating a spent ammoniacal cuprous solution that has been used for absorbing carbon oxides from the feed gases to an ammonia synthesis unit comprising the steps of, causing a substantially continuous stream of said spent solution to flow along a gas-liquid contact path from the entry end to the discharge end thereof, passing the solution from said discharge end of said contact path through a regenerating zone, heating said solution in said regenerating zone to liberate therefrom a mixture of carbon oxides and ammonia and to regenerate said solution, causing the thus liberated mixture of carbon oxides and ammonia to flow to said discharge end of said contact path and along said contact path countercurrently to said continuous stream of spent solution to cause the ammonia in said mixture to be preferentially absorbed by the solution in said contact path, removing at said entry end of said contact path gases not absorbed by said solution in said contact path, and maintaining a back pressure on said contact path and said regenerating zone to produce a desired cupric-cuprous ratio in the regenerated solution while minimizing reduction of cuprous copper to elemental copper and to improve the absorption of gaseous ammonia by said stream of solution.

4. A process for regenerating a spent ammoniacal cuprous solution that has been used for absorbing carbon oxides from the feed gases to an ammonia synthesis unit comprising the steps of, causing a substantially continuous stream of said spent solution to flow downwardly along a vertical gas-liquid contact path from the top to the bottom thereof, passing the solution leaving said contact path through a regenerating zone, heating said solution in said regenerating zone to liberate therefrom a mixture of carbon oxides and ammonia and to regenerate said solution, causing the thus liberated mixture of carbon oxides and ammonia to flow to said bottom of said contact path and upwardly along said contact path countercurrently to said continuous stream of spent solution to cause the ammonia in said mixture to be preferentially absorbed by said stream of solution in said contact path, removing from said top of said contact path gases not absorbed by said solution in said contact path and maintaining a back pressure on said contact path and said regenerating zones to produce a desired reduction of said solution.

JOSEF G. DELY.

REFERENCES CITED

The following references are of record in the file of this patent:

UNITED STATES PATENTS

| Number | Name | Date |
|---|---|---|
| 1,597,345 | Dely | Aug. 24, 1926 |
| 1,790,303 | Gosselin | Jan. 27, 1931 |
| 2,029,411 | Christensen | Feb. 4, 1936 |
| 2,047,550 | Dely | July 14, 1936 |
| 2,264,878 | Hatch | Dec. 2, 1941 |

Certificate of Correction

Patent No. 2,455,473.                                                                December 7, 1948.

JOSEF G. DELY

It is hereby certified that error appears in the printed specification of the above numbered patent requiring correction as follows:

Column 4, line 17, strike out the words "interpreted as illustrative and not in a" and insert instead *understood that all matter hereinbefore;* and that the said Letters Patent should be read with this correction therein that the same may conform to the record of the case in the Patent Office.

Signed and sealed this 17th day of May, A. D. 1949.

[SEAL]

THOMAS F. MURPHY,
*Assistant Commissioner of Patents.*